US012809327B2

(12) United States Patent
Denison

(10) Patent No.: US 12,809,327 B2
(45) Date of Patent: Nov. 24, 2026

(54) METHODS AND APPARATUS TO DISPLAY SHIFT CHANGE NOTES GENERATED VIA NATURAL LANGUAGE PROCESSING MODELS

(71) Applicant: Fisher-Rosemount Systems, Inc., Round Rock, TX (US)

(72) Inventor: David R. Denison, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 272 days.

(21) Appl. No.: 18/422,845

(22) Filed: Jan. 25, 2024

(65) Prior Publication Data

US 2025/0244735 A1 Jul. 31, 2025

(51) Int. Cl.
*G05B 19/042* (2006.01)
*G06F 40/40* (2020.01)

(52) U.S. Cl.
CPC ..... *G05B 19/0423* (2013.01); *G05B 19/0426* (2013.01); *G06F 40/40* (2020.01); *G05B 2219/23272* (2013.01); *G05B 2219/24167* (2013.01)

(58) Field of Classification Search
CPC ............ G05B 19/0423; G05B 19/0426; G05B 2219/23272; G05B 2219/24167; G06F 40/40
See application file for complete search history.

(56) References Cited

U.S. PATENT DOCUMENTS 10,229,361 B2 * 3/2019 Chandramohan ........ G06N 7/01
10,310,471 B2 * 6/2019 Krasadakis .......... G05B 19/048
2007/0195944 A1 8/2007 Korenblit et al.
2009/0089108 A1 * 4/2009 Angell ............... G06Q 10/0635 705/7.28
2013/0085795 A1 4/2013 Caldwell et al.
2022/0058589 A1 2/2022 Qian et al.
2024/0020756 A1 1/2024 Wayne et al.
2025/0004464 A1 * 1/2025 Sarkar .................. G05B 19/409

OTHER PUBLICATIONS

International Searching Authority, "International Search Report," issued in connection with International Patent Application No. PCT/US2025/012140, mailed on Mar. 26, 2025, 4 pages.
International Searching Authority, "Written Opinion," issued in connection with International Patent Application No. PCT/US2025/012140, mailed on Mar. 26, 2025, 13 pages.

* cited by examiner

*Primary Examiner* — Christopher E. Everett
(74) *Attorney, Agent, or Firm* — Hanley, Flight & Zimmerman, LLC

(57) ABSTRACT

Methods and apparatus to display shift change notes generated via natural language processing models are disclosed. An example apparatus comprises interface circuitry, machine-readable instructions, and at least one processor circuit to be programmed by the machine-readable instructions to access input data from a workstation in a process control system, the input data associated with a first user account, transmit the input data to a natural language processing (NLP) model, the NLP model to generate a representation of the input data based on stored data associated with the process control system, and display the representation of the input data on a user interface of the workstation after detecting an access of a second user account different from the first user account.

20 Claims, 4 Drawing Sheets

METHODS AND APPARATUS TO DISPLAY SHIFT CHANGE NOTES GENERATED VIA NATURAL LANGUAGE PROCESSING MODELS

FIELD OF THE DISCLOSURE

This disclosure relates generally to process control systems and, more particularly, to methods and apparatus to display shift change notes generated via natural language processing models.

BACKGROUND

Process control systems, like those used in chemical, oil refining or other processes, typically include one or more process controllers or devices communicatively coupled to an operator workstation and one or more field devices. These controllers can receive signals indicative of process measurements made by the field devices and generate control signals based on those measurements. Information from the field devices and the controllers may be made available to one or more user interface applications and visually presented to a user via an operator workstation.

BRIEF DESCRIPTION OF THE DRAWINGS

In general, the same reference numbers will be used throughout the drawing(s) and accompanying written description to refer to the same or like parts. The figures are not necessarily to scale.

DETAILED DESCRIPTION

Figure 1:
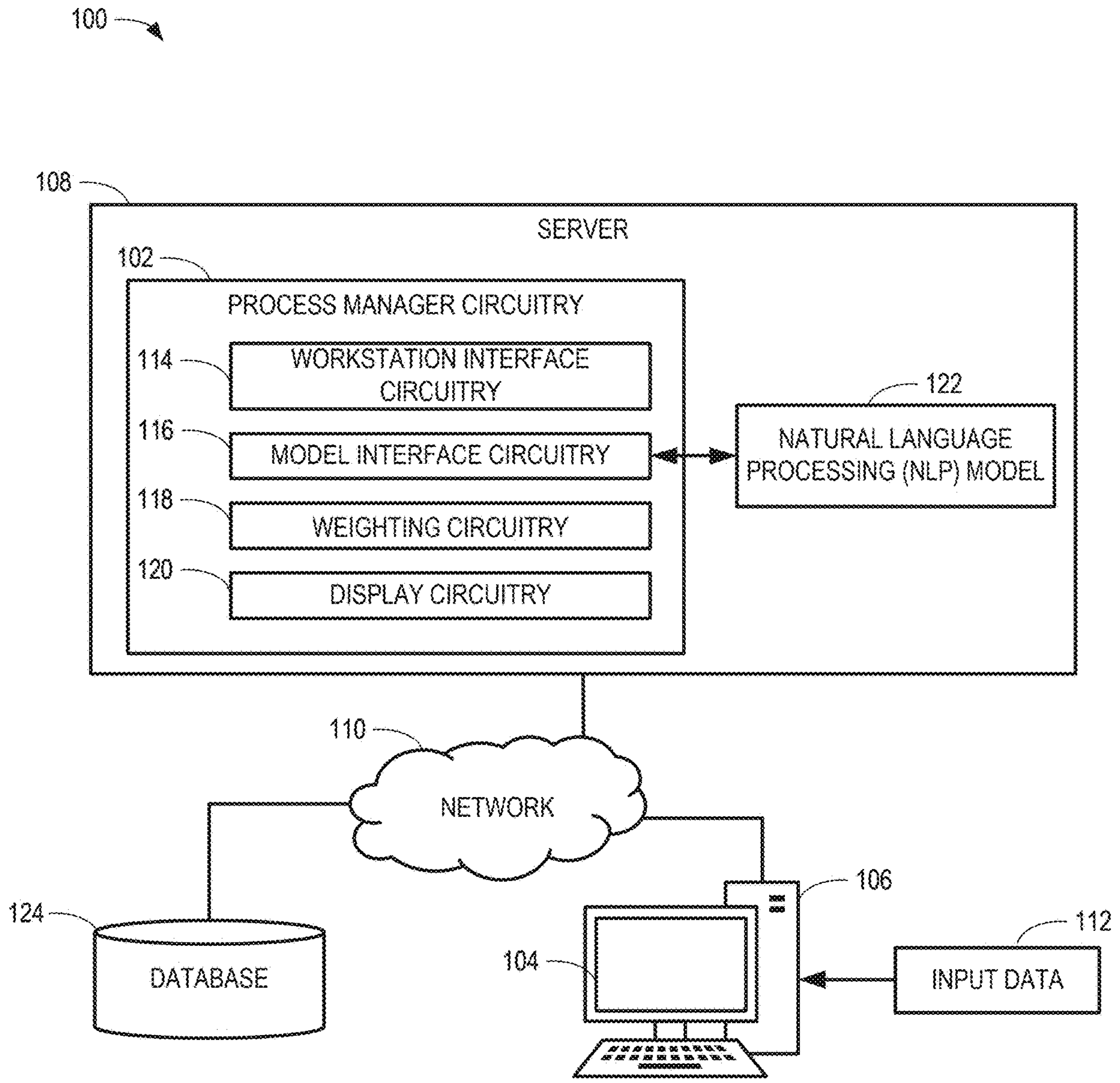
FIG. 1 is a block diagram of an example process control environment in which example process manager circuitry operates to modify an example user interface of a workstation.

A process control system can include a plurality of field devices that provide different functional capabilities and which are typically communicatively coupled to process controllers. In some examples, data (e.g., operating condition data) associated with such process control systems can be displayed (e.g., presented, illustrated, announced, etc.) via workstations within the process control systems. For example, the data can be illustrated as graphics on a user interface (UI) associated with an example workstation. In some examples, the graphics can provide a numerical and/or pictorial representation of the data that operators, engineers, and/or other process control personnel use to monitor, control, and evaluate the performance of a process control system. UIs enable an operator to access an abundance of system information, but some system information may be lost during a shift change. As used herein, the phrase "shift change" refers to a time (e.g., a time interval) during which a first shift of operators in a process control system handover control (e.g., monitoring) of the system to a second shift of operators. For example, a first operator may operate a workstation in a process control system during a first shift and a second operator may operate the workstation during a second shift. During an example shift change, the first operator may relay information (e.g., notes, alarms, events, etc.) to the second operator via the workstation (e.g., a notes page on the workstation, a web page available via the workstation, email, etc.). In some examples, the first shift and the second shift are sequential relative to one another. For example, the first shift of operators may monitor and/or control the process control system during a first time interval (e.g., 8 AM to 5 PM) and the second shift of operators may monitor and/or control the process control system during a second time interval (e.g., 5 PM to 12 AM) sequential relative to the first time interval. In such examples, the shift change may occur at approximately 5 PM (e.g., in a range from 4:50 PM to 5:10 PM). In some examples, notes provided by a first shift operator may be lost and/or improperly captured during shift change due to operator preference, operator experience (e.g., years on the job), the amount of time the operator had to input shift notes, etc. In other examples, the second shift operator may have difficulty interpreting and/or accessing notes from the first shift operator. Such miscommunications may cause equipment damage, process downtime, etc., that can lead to suboptimal operation of the process control system.

Examples disclosed herein employ natural language processing (NLP) models to interpret, modify, and/or represent shift change notes on a workstation operating in a process control system. Disclosed examples provide accessible representations of shift change notes that emphasize key notes (e.g., alarms) from accessory notes (e.g., redundant information, out-of-date information, etc.) associated with the process control system. For example, disclosed examples transmit shift change notes associated with a first shift operator to a NLP model that, in turn, generates an example representation of the shift change notes. A second shift operator can access the representation of the shift change notes, where the representation is easier to read, understand, navigate, etc., than the shift change notes themselves. As such, examples disclosed herein provide an operator (e.g., a second shift operator) of an example workstation in the process control system with a straightforward, intuitive representation of the process control system. Additionally, examples disclosed herein enable a second shift operator to promptly respond to system abnormalities and alarms that may have been identified by a first shift operator.

FIG. 1 is a block diagram of an example process control environment 100 in which example process manager circuitry 102 operates to modify an example user interface (UI) 104 of an example workstation 106. In this example, the process manager circuitry 102 is included in an example server 108 communicatively coupled to the workstation 106 via an example network 110. In some examples, the network 110 is the Internet. However, the example network 110 may be implemented using any suitable wired and/or wireless network(s) including, for example, one or more data buses, one or more local area networks (LANs), one or more wireless LANs (WLANs), one or more cellular networks, one or more coaxial cable networks, one or more satellite networks, one or more private networks, one or more public networks, etc. As used herein, the term "communicate" including variances (e.g., secure or non-secure communications, compressed or non-compressed communications, etc.)

thereof, encompasses direct communication and/or indirect communication through one or more intermediary components and does not require direct physical (e.g., wired) communication and/or constant communication, but rather includes selective communication at periodic or aperiodic intervals, as well as one-time events.

In other examples, the process manager circuitry 102 may be implemented by and/or included within the example workstation 106. The example process control environment 100 may include any type of process control system such as a manufacturing facility, process facility, automation facility, and/or any other type of process control structure. Further, the example process control environment 100 may include field devices capable of receiving inputs, generating outputs, and/or controlling a process. For example, the field devices may include valves, pumps, fans, heaters, coolers, strippers, tanks, drums, coalescers, separators, reactors, desalters, piping, etc., to control a process. Additionally, the field devices may include measurement and/or monitoring devices such as temperature sensors, pressure sensors, concentration sensors, fluid level meters, flow meters, and/or vapor sensors to measure portions of a process. The example field devices receive instructions from the workstation 106 (and/or a controller associated with the workstation 106) to execute specified operations within the process implemented and/or controlled by the field devices. Further, the example field devices measure process data, environmental data, and/or input device data and transmit the measured data to the workstation 106 as process control information.

The example UI 104 allows an operator to review, monitor, and/or operate the process control environment 100 via the workstation 106. The example workstation 106 may include any computing device such as a personal computer, a laptop, a server, etc. The example workstation 106 displays information pertaining to the field devices and/or the process control environment 100 via the UI 104. Further, the example UI 104 includes graphical instrumentality (e.g., keyboard, pointer device, touchscreen, microphone, etc.) to enable an operator (e.g., a first shift operator) of the workstation 106 to provide example input data 112. For example, the operator can manipulate (e.g., select, control, etc.) the graphical instrumentality to provide the input data 112. In the example of FIG. 1, the input data 112 includes shift change notes. The example input data 112 may also include instructions to control the field devices, identification information associated with the operator of the workstation 106, activity associated with the operator of the workstation 106, shift time information, etc.

The example process manager circuitry 102 operates to modify the UI 104 based on the input data 112 provided by a first shift operator. As such, the example process manager circuitry 102 can provide a second shift operator with a representation of the input data 112 via the UI 104. The example process manager circuitry 102 includes example workstation interface circuitry 114, example model interface circuitry 116, example weighting circuitry 118, and example display circuitry 120. The process manager circuitry 102 of FIG. 1 may be instantiated (e.g., creating an instance of, bring into being for any length of time, materialize, implement, etc.) by programmable circuitry such as a Central Processor Unit (CPU) executing first instructions. Additionally or alternatively, the process manager circuitry 102 of FIG. 1 may be instantiated (e.g., creating an instance of, bring into being for any length of time, materialize, implement, etc.) by an Application Specific Integrated Circuit (ASIC) configured in response to execution of second instructions to perform operations corresponding to the first instructions. It should be understood that some or all of the circuitry of FIG. 1 may, thus, be instantiated at the same or different times. Some or all of the circuitry of FIG. 1 may be instantiated, for example, in one or more threads executing concurrently on hardware and/or in series on hardware. Moreover, in some examples, some or all of the circuitry of FIG. 1 may be implemented by microprocessor circuitry executing instructions performing operations to implement one or more virtual machines and/or containers.

The example workstation interface circuitry 114 accesses the input data 112 from the workstation 106 in the process control system. In some examples, the input data 112 corresponds to an event, a notification, an operator note, a shift change note, or an alarm associated with the process control system. The example input data 112 includes activity, notes, information, etc., recorded (e.g., provided, inputted, etc.) by a first shift operator in the process control system. Thus, the example input data 112 can be associated with a first user account corresponding to the first shift operator. The first shift operator accesses the workstation 106 with his/her first user account (e.g., username, password, identification code, etc.) that uniquely identifies the first shift operator as a user on the workstation 106. The example workstation interface circuitry 114 accesses the input data 112 recorded by the first shift operator during the first shift (e.g., first time interval). In some examples, the workstation interface circuitry 114 can detect an access of a second user account (associated with a second shift operator) when the second shift operator logs on to the workstation 106 for the second shift (e.g., sequential relative to the first shift). In other examples, the workstation interface circuitry 114 can access a request for the input data 112 (e.g., a representation of the input data 112) from a second user account. For example, the second shift operator may request the workstation 106 for specific information from the first shift (e.g., via an input field in the UI 104 of the workstation 106).

The example model interface circuitry 116 transmits the input data 112 to an example NLP model 122. In this example, the NLP model 122 is hosted and/or implemented by the server 108. In other examples, the NLP model 122 may be hosted and/or implemented by the workstation 106. The NLP model 122 generates a representation of the input data 112 based on data associated with the process control system stored in an example database 124. For example, the NLP model 122 processes the input data 112 to generate output data (e.g., the representation) based on patterns and/or associations previously learned by the NLP model 122 during a training process. For instance, the NLP model 122 may be trained with the data stored in the database 124 to recognize patterns and/or associations and follow such patterns and/or associations when processing input data such that other input(s) results in output(s) consistent with the recognized patterns and/or associations. In this example, the NLP model 122 is trained to recognize patterns based on word dependencies within the input data 112. For example, if the input data 112 includes a note from the first shift operator such as "Watch Valve 1, flow rate out of spec," then the NLP model 122 can generate a representation of the note as a visual monitoring of the specifications of Valve 1 and/or a visual representation of the behavior of Valve 1 during the first shift. The NLP model 122 is trained to understand that the term "watch" may not mean visually look at Valve 1 itself, but rather "monitor" and/or "check" the flow rate associated with Valve 1. The NLP model 122 may have learned this pattern (e.g., "watch" means "monitor") based on historical data associated with shift change notes stored in the database 124.

In some examples, the NLP model 122 may generate a graphical representation of the input data 112, a textual representation of the input data 112, and/or a sound. In the Valve 1 example, the NLP model 122 may generate a graphical representation (e.g., an icon, a picture, etc.) of Valve 1 that visually depicts the flow rate of Valve 1 during the first shift (e.g., as fluid moving through the input/output of the graphical representation). The NLP model 122 may generate such a graphical representation to use and/or change color of Valve 1 based on whether the flow rate was out of specification during the first shift (e.g., green Valve 1 indicates good performance, red Valve 1 indicates poor performance, etc.). Alternatively, the NLP model 122 may generate a textual representation of Valve 1 that textually (e.g., numerically) displays the value of the flow rate (e.g., 25 meters cubed per second ($m^3/s$)) that occurred during the first shift. Further, the NLP model 122 may generate a sound that alerts a user (e.g., a second shift operator) that Valve 1 approached an out of specification flow rate during the first shift.

In some examples, the NLP model 122 may generate a first representation of the input data 112 and a second representation of differences between the input data 112 and the stored data (e.g., historical data) in the database 124. If the stored data indicates that Valve 1 is rarely (or has never been) out of spec for longer than one minute, and the input data 112 indicates that Valve 1 had been out of spec in the previous shift for 10 minutes, then the NLP model 122 can generate a second representation of the input data 112 that emphasizes (e.g., highlights) this anomaly (e.g., difference) compared to the historical data. In some examples, at least one of the first representation or the second representation may include root cause analysis (e.g., techniques to mitigate the anomaly) based on previous solutions/mitigations to past anomalies (stored in the database 124). In turn, the model interface circuitry 116 can access the first representation of the input data 112 and the second representation of the input data 112 that captures such an anomaly.

The example weighting circuitry 118 assigns (e.g., associates) weights to portions of the representation(s) accessed by the model interface circuitry 116. In some examples, the weighting circuitry 118 can assign weights in a range from 0 to 1. For example, if the representation includes the first representation of the input data 112 and the second representation of at least one anomaly in the input data 112 (compared to the stored data), then the weighting circuitry 118 can assign a first weight (e.g., 0.3) to the first representation and a second weight (e.g., 0.7) to the second representation. In some examples, the weighting circuitry 118 may assign a greater weight to the portion of the representation that illustrates the anomaly because such anomalies may cause an error and/or equipment breakdown. In other examples, the weighting circuitry 118 may assign a lower weight to the portion of the representation that illustrates a frequent event. For example, if the portion of the representation indicates that a first event (e.g., the operating temperature of Valve 1 is 75 degrees Celsius (° C.)) and the stored data in the database 124 indicated that the first event is common (e.g., occurs more than 10 times in the history of Valve 1), then the weighting circuitry 118 may assign a low weight (e.g., 0.1) to the portion of the representation that indicates the first event.

The example display circuitry 120 displays (e.g., illustrates, presents, etc.) the representation of the input data 112 on the UI 104. For example, the display circuitry 120 displays the representation of the input data 112 on the UI 104 after the workstation interface circuitry 114 detects an access of a second user account on the workstation 106. In other examples, the display circuitry 120 can display the representation of the input data 112 on the UI 104 after the workstation interface circuitry 114 receives (e.g., accesses) a request for the input data 112 from the second user account. In some examples, the display circuitry 120 can display the first representation of the input data 112 and the second representation of the input data 112 that captures at least one anomaly on the UI 104. Further, the display circuitry 120 can modify (e.g., change) at least one of the first representation or the second representation based on weights assigned by the weighting circuitry 118. For example, if the second weight assigned to the second representation is greater than the first weight assigned to the first representation, then the display circuitry 120 can modify the UI 104 to emphasize the second representation (e.g., enlarge the icon, bold the text, generate a sound, etc.). As such, the UI 104 can draw the attention of an example operator (e.g., a second shift operator) to anomalies in the process control environment 100.

Figure 2:
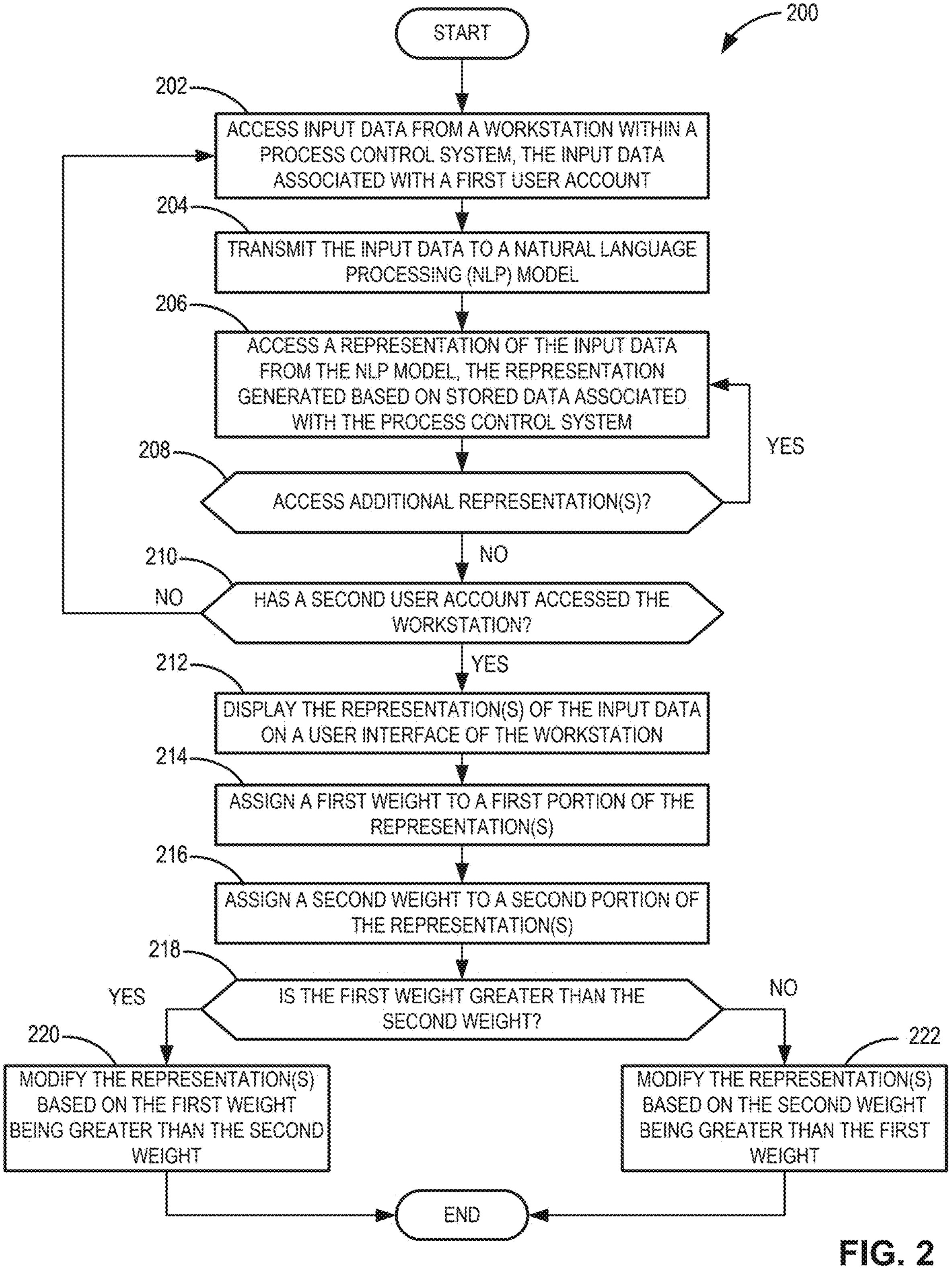
FIG. 2 is a flowchart representative of example machine readable instructions and/or example operations that may be executed, instantiated, and/or performed by example programmable circuitry to implement the process manager circuitry of FIG. 1.

In some examples, the workstation interface circuitry 114 is instantiated by programmable circuitry executing workstation interfacing instructions and/or configured to perform operations such as those represented by the flowchart of FIG. 2. In some examples, the process manager circuitry 102 includes means for accessing input data. For example, the means for accessing may be implemented by the workstation interface circuitry 114. In some examples, the workstation interface circuitry 114 may be instantiated by programmable circuitry such as the example programmable circuitry 312 of FIG. 3. For instance, the workstation interface circuitry 114 may be instantiated by the example microprocessor 400 of FIG. 4 executing machine executable instructions such as those implemented by at least blocks 202, 210 of FIG. 2. In some examples, the workstation interface circuitry 114 may be instantiated by hardware logic circuitry, which may be implemented by an ASIC, XPU, or circuitry configured and/or structured to perform operations corresponding to the machine readable instructions. Additionally or alternatively, the workstation interface circuitry 114 may be instantiated by any other combination of hardware, software, and/or firmware. For example, the workstation interface circuitry 114 may be implemented by at least one or more hardware circuits (e.g., processor circuitry, discrete and/or integrated analog and/or digital circuitry, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the model interface circuitry 116 is instantiated by programmable circuitry executing model interfacing instructions and/or configured to perform operations such as those represented by the flowchart of FIG. 2. In some examples, the process manager circuitry 102 includes means for transmitting data to an example model (e.g., an NLP model). For example, the means for transmitting may be implemented by the model interface circuitry 116. In some examples, the model interface circuitry 116 may be instantiated by programmable circuitry such as the example programmable circuitry 312 of FIG. 3. For instance, the model interface circuitry 116 may be instantiated by the example microprocessor 400 of FIG. 4 executing machine executable instructions such as those implemented by at least blocks 204, 206, 208 of FIG. 2. In some examples, the model interface circuitry 116 may be instantiated by hardware logic circuitry, which may be implemented by an ASIC, XPU, or circuitry configured and/or structured to perform operations corresponding to the machine readable instructions. Additionally or alternatively, the model interface circuitry 116 may be instantiated by any other combination of hardware, software, and/or firmware. For example, the model interface circuitry 116 may be implemented by at least one or more hardware circuits (e.g., processor circuitry, discrete and/or integrated analog and/or digital circuitry, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the weighting circuitry 118 is instantiated by programmable circuitry executing weighting instructions and/or configured to perform operations such as those represented by the flowchart of FIG. 2. In some examples, the process manager circuitry 102 includes means for weighting portions of a representation. For example, the means for weighting may be implemented by the weighting circuitry 118. In some examples, the weighting circuitry 118 may be instantiated by programmable circuitry such as the example programmable circuitry 312 of FIG. 3. For instance, the weighting circuitry 118 may be instantiated by the example microprocessor 400 of FIG. 4 executing machine executable instructions such as those implemented by at least blocks 214, 216, 218 of FIG. 2. In some examples, the weighting circuitry 118 may be instantiated by hardware logic circuitry, which may be implemented by an ASIC, XPU, or circuitry configured and/or structured to perform operations corresponding to the machine readable instructions. Additionally or alternatively, the weighting circuitry 118 may be instantiated by any other combination of hardware, software, and/or firmware. For example, the weighting circuitry 118 may be implemented by at least one or more hardware circuits (e.g., processor circuitry, discrete and/or integrated analog and/or digital circuitry, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the display circuitry 120 is instantiated by programmable circuitry executing display instructions and/or configured to perform operations such as those represented by the flowchart of FIG. 2. In some examples, the process manager circuitry 102 includes means for displaying a representation. For example, the means for displaying may be implemented by the display circuitry 120. In some examples, the display circuitry 120 may be instantiated by programmable circuitry such as the example programmable circuitry 312 of FIG. 3. For instance, the display circuitry 120 may be instantiated by the example microprocessor 400 of FIG. 4 executing machine executable instructions such as those implemented by at least blocks 212, 220, 222 of FIG. 2. In some examples, the display circuitry 120 may be instantiated by hardware logic circuitry, which may be implemented by an ASIC, XPU, or circuitry configured and/or structured to perform operations corresponding to the machine readable instructions. Additionally or alternatively, the display circuitry 120 may be instantiated by any other combination of hardware, software, and/or firmware. For example, the display circuitry 120 may be implemented by at least one or more hardware circuits (e.g., processor circuitry, discrete and/or integrated analog and/or digital circuitry, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the process manager circuitry 102 of FIG. 1 is illustrated in FIG. 1, one or more of the elements, processes, and/or devices illustrated in FIG. 1 may be combined, divided, re-arranged, omitted, eliminated, and/or implemented in any other way. Further, the example workstation interface circuitry 114, the example model interface circuitry 116, the example weighting circuitry 118, the example display circuitry 120, and/or, more generally, the example process manager circuitry 102 of FIG. 1, may be implemented by hardware alone or by hardware in combination with software and/or firmware. Thus, for example, any of the example workstation interface circuitry 114, the example model interface circuitry 116, the example weighting circuitry 118, the example display circuitry 120, and/or, more generally, the example process manager circuitry 102, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), and/or programmable logic device (s) (PLD(s)). Further still, the example process manager circuitry 102 of FIG. 1 may include one or more elements, processes, and/or devices in addition to, or instead of, those illustrated in FIG. 1, and/or may include more than one of any or all of the illustrated elements, processes and devices.

A flowchart representative of example machine readable instructions, which may be executed by programmable circuitry to implement and/or instantiate the process manager circuitry 102 of FIG. 1 and/or representative of example operations which may be performed by programmable circuitry to implement and/or instantiate the process manager circuitry 102 of FIG. 1, are shown in FIG. 2. The machine readable instructions may be one or more executable programs or portion(s) of one or more executable programs for execution by programmable circuitry such as the programmable circuitry 312 shown in the example programmable circuitry platform 300 discussed below in connection with FIG. 3 and/or may be one or more function(s) or portion(s) of functions to be performed by the example programmable circuitry discussed below in connection with FIG. 4. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 2, many other methods of implementing the example process manager circuitry 102 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU, one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 2 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 2 is a flowchart representative of example machine readable instructions and/or example operations 200 that may be executed, instantiated, and/or performed by programmable circuitry to modify a UI based on input data from a shift operator. The example machine-readable instructions and/or the example operations 200 of FIG. 2 begin at block 202, at which the workstation interface circuitry 114 accesses the input data 112 from the workstation 106 within a process control system (e.g., within the process control environment 100). The example input data 112 includes activity, notes, information, etc., recorded by a first shift operator in the process control system. Thus, the example input data 112 can be associated with a first user account corresponding to the first shift operator.

At block 204, the example model interface circuitry 116 transmits the input data 112 to the NLP model 122. The example NLP model 122 generates a representation (e.g., a graphical representation, a textual representation, a sound, etc.) of the input data 112 (e.g., associated with the first shift) based on data associated with the process control system stored in the database 124.

At block 206, the example model interface circuitry 116 accesses the representation of the input data 112 from the NLP model 122. In this example, the representation of the input data 112 was generated based on stored data associated with the process control environment 100 during the first shift. In other examples, the NLP model 122 may have generated at least one additional representation of the input data 112 that highlights anomalies compared to the stored data.

At block 208, the example model interface circuitry 116 determines whether there are additional representations to access from the NLP model 122. If there are additional representations to access from the NLP model 122, the process returns to block 206. For example, the NLP model 122 may have generated additional representations based on differences (e.g., at least one anomaly) between the input data 112 and the stored data in the database 124. In such examples, the process returns to block 206 so the model interface circuitry 116 can access the additional representation. Alternatively, if there are no additional representations to access from the NLP model 122, the process proceeds to block 210. For example, if the NLP model 122 did not determine any anomalies in the input data 112 compared to the stored data, then the NLP model 122 may not have generated any additional representations of the input data 112. In such examples, the process proceeds to block 210.

At block 210, the example workstation interface circuitry 114 determines whether a second user account has accessed the workstation 106. If the workstation interface circuitry 114 determines that a second user account has accessed the workstation 106, then the process proceeds to block 212. For example, the workstation interface circuitry 114 may detect an access of a second user account (associated with a second shift operator) when the second shift operator logs on the workstation 106 for the second shift. In such an example, the workstation interface circuitry 114 can determine that a second user account has accessed the workstation 106, and the process proceeds to block 212. In other examples, the workstation interface circuitry 114 can access a request for the input data 112 from a second user account. In such examples, the workstation interface circuitry 114 can determine that a second user account has accessed the workstation, and the process proceeds to block 212. Alternatively, if the workstation interface circuitry 114 determines that a second user account has not accessed the workstation 106, then the process returns to block 202. In other words, the process manager circuitry 102 continues to monitor the input data 112 and/or the process control environment 100 until the workstation interface circuitry 114 determines that a second user account has accessed the workstation 106 (block 210).

At block 212, the example display circuitry 120 displays the representation(s) (e.g., at least one of the first representation or the second representation) of the input data 112 on the UI 104 of the workstation 106. For example, the display circuitry 120 displays the representation of the input data 112 on the UI 104 after the workstation interface circuitry 114 detects an access of a second user account on the workstation 106. In other examples, the display circuitry 120 can display the representation of the input data 112 on the UI 104 after the workstation interface circuitry 114 receives (e.g., accesses) a request for the input data 112 from the second user account. In some examples, the display circuitry 120 can display the first representation of the input data 112 and the second representation of the input data 112 that captures at least one anomaly on the UI 104.

At block 214, the example weighting circuitry 118 assigns a first weight to a first portion of the representation. For example, the weighting circuitry 118 can assign a first weight to the first representation of the input data 112.

At block 216, the example weighting circuitry 118 assigns a second weight to a second portion of the representation. For example, the weighting circuitry 118 can assign a second weight to the second representation of at least one anomaly in the input data 112.

At block 218, the example weighting circuitry 118 determines whether the first weight is greater than the second weight. If the example weighting circuitry 118 determines that the first weight is greater than the second weight, then the process proceeds to block 220. Alternatively, if the example weighting circuitry 118 determines that the second weight is greater than the first weight, then the process proceeds to block 222.

At block 220, the example display circuitry 120 modifies the representation(s) based on the first weight being greater than the second weight. For example, the display circuitry 120 can enlarge, amplify, highlight, change the color of, etc., the first representation of the input data 112 based on the first weight being greater than the second weight. As such, the display circuitry 120 can modify the first representation to draw the attention of the second shift operator to the first representation. Then, the process ends.

At block 222, the example display circuitry 120 modifies the representation(s) based on the second weight being greater than the first weight. For example, the display circuitry 120 can enlarge, amplify, highlight, change the color of, etc., the second representation of the input data 112 that includes at least one anomaly (compared to the stored data) based on the second weight being greater than the first weight. As such, the display circuitry 120 can modify the second representation to draw the attention of the second shift operator to the second representation (e.g., to the at least one anomaly). Then, the process ends.

Figure 3:
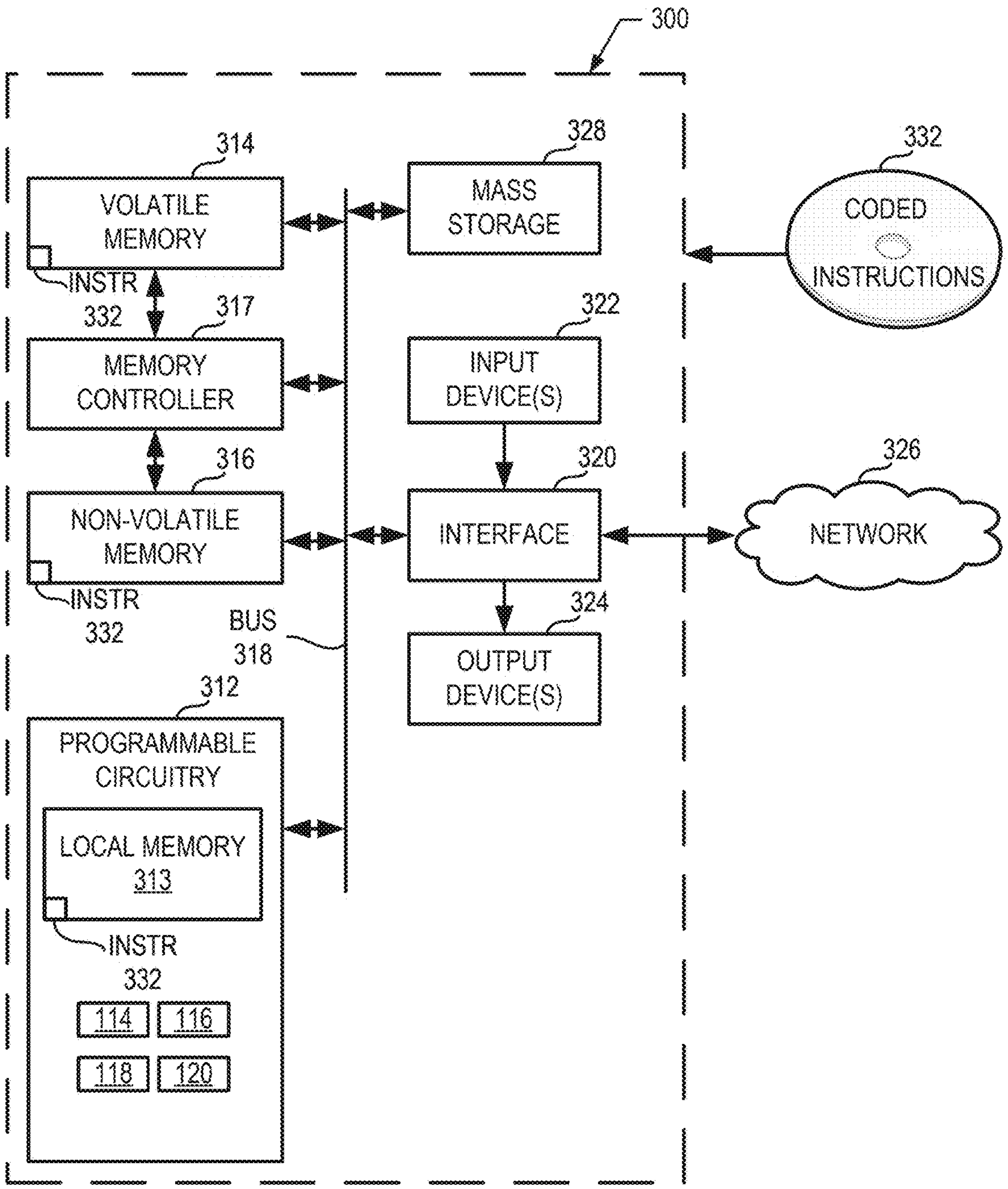
FIG. 3 is a block diagram of an example processing platform including programmable circuitry structured to execute, instantiate, and/or perform the example machine readable instructions and/or perform the example operations of FIG. 2 to implement the process manager circuitry of FIG. 1.

FIG. 3 is a block diagram of an example programmable circuitry platform 300 structured to execute and/or instantiate the example machine-readable instructions and/or the example operations of FIG. 2 to implement the process manager circuitry 102 of FIG. 1. The programmable circuitry platform 300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 300 of the illustrated example includes programmable circuitry 312. The programmable circuitry 312 of the illustrated example is hardware. For example, the programmable circuitry 312 can be implemented by one or more integrated circuits, logic circuits, microprocessors, CPUs, GPUs, DSPs, and/or microcontrollers from any desired family or manufacturer. The programmable circuitry 312 may be implemented by one or more semiconductor based (e.g., silicon based) devices. In this example, the programmable circuitry 312 implements the example workstation interface circuitry 114, the example model interface circuitry 116, the example weighting circuitry 118, and the example display circuitry 120.

The programmable circuitry 312 of the illustrated example includes a local memory 313 (e.g., a cache, registers, etc.). The programmable circuitry 312 of the illustrated example is in communication with main memory 314, 316, which includes a volatile memory 314 and a non-volatile memory 316, by a bus 318. The volatile memory 314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 316 may be implemented by flash memory and/or any other desired type of memory device. Access to the main memory 314, 316 of the illustrated example is controlled by a memory controller 317. In some examples, the memory controller 317 may be implemented by one or more integrated circuits, logic circuits, microcontrollers from any desired family or manufacturer, or any other type of circuitry to manage the flow of data going to and from the main memory 314, 316.

The programmable circuitry platform 300 of the illustrated example also includes interface circuitry 320. The interface circuitry 320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 322 are connected to the interface circuitry 320. The input device(s) 322 permit(s) a user (e.g., a human user, a machine user, etc.) to enter data and/or commands into the programmable circuitry 312. The input device(s) 322 can be implemented by, for example, an audio sensor, a microphone, a camera (still or video), a keyboard, a button, a mouse, a touchscreen, a trackpad, a trackball, an isopoint device, and/or a voice recognition system.

One or more output devices 324 are also connected to the interface circuitry 320 of the illustrated example. The output device(s) 324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 320 of the illustrated example, thus, typically includes a graphics driver card, a graphics driver chip, and/or graphics processor circuitry such as a GPU.

The interface circuitry 320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 326. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 300 of the illustrated example also includes one or more mass storage discs or devices 328 to store firmware, software, and/or data. Examples of such mass storage discs or devices 328 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 332, which may be implemented by the machine readable instructions of FIG. 2, may be stored in the mass storage device 328, in the volatile memory 314, in the non-volatile memory 316, and/or on at least one non-transitory computer readable storage medium such as a CD or DVD which may be removable.

Figure 4:
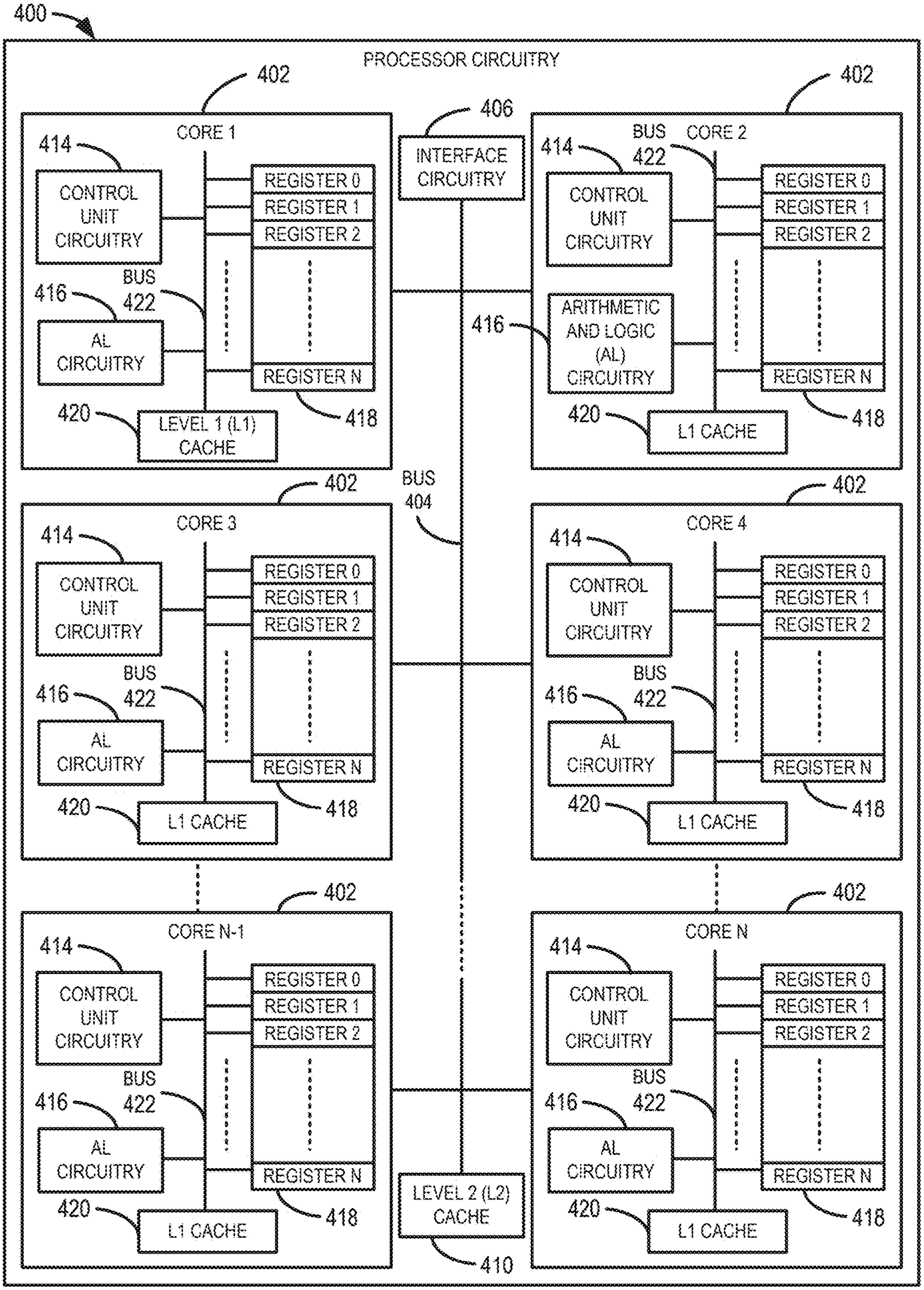
FIG. 4 is a block diagram of an example implementation of the programmable circuitry of FIG. 3.

FIG. 4 is a block diagram of an example implementation of the programmable circuitry 312 of FIG. 3. In this example, the programmable circuitry 312 of FIG. 3 is implemented by a microprocessor 400. For example, the microprocessor 400 may be a general-purpose microprocessor (e.g., general-purpose microprocessor circuitry). The microprocessor 400 executes some or all of the machine-readable instructions of the flowchart of FIG. 2 to effectively instantiate the circuitry of FIG. 1 as logic circuits to perform operations corresponding to those machine readable instructions. In some such examples, the circuitry of FIG. 1 is instantiated by the hardware circuits of the microprocessor 400 in combination with the machine-readable instructions. For example, the microprocessor 400 may be implemented by multi-core hardware circuitry such as a CPU, a DSP, a GPU, an XPU, etc. Although it may include any number of example cores 402 (e.g., 1 core), the microprocessor 400 of this example is a multi-core semiconductor device including N cores. The cores 402 of the microprocessor 400 may operate independently or may cooperate to execute machine readable instructions. For example, machine code corresponding to a firmware program, an embedded software program, or a software program may be executed by one of the cores 402 or may be executed by multiple ones of the cores 402 at the same or different times. In some examples, the machine code corresponding to the firmware program, the embedded software program, or the software program is split into threads and executed in parallel by two or more of the cores 402. The software program may correspond to a portion or all of the machine readable instructions and/or operations represented by the flowchart of FIG. 2.

The cores 402 may communicate by a first example bus 404. In some examples, the first bus 404 may be implemented by a communication bus to effectuate communication associated with one(s) of the cores 402. For example, the first bus 404 may be implemented by at least one of an Inter-Integrated Circuit (I2C) bus, a Serial Peripheral Interface (SPI) bus, a PCI bus, or a PCIe bus. Additionally or alternatively, the first bus 404 may be implemented by any other type of computing or electrical bus. The cores 402 may obtain data, instructions, and/or signals from one or more external devices by example interface circuitry 406. The cores 402 may output data, instructions, and/or signals to the one or more external devices by the interface circuitry 406. Although the cores 402 of this example include example local memory 420 (e.g., Level 1 (L1) cache that may be split into an L1 data cache and an L1 instruction cache), the microprocessor 400 also includes example shared memory 410 that may be shared by the cores (e.g., Level 2 (L2 cache)) for high-speed access to data and/or instructions. Data and/or instructions may be transferred (e.g., shared) by writing to and/or reading from the shared memory 410. The local memory 420 of each of the cores 402 and the shared memory 410 may be part of a hierarchy of storage devices including multiple levels of cache memory and the main memory (e.g., the main memory 314, 316 of FIG. 3). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 402 may be referred to as a CPU, DSP, GPU, etc., or any other type of hardware circuitry. Each core 402 includes control unit circuitry 414, arithmetic and logic (AL) circuitry (sometimes referred to as an ALU) 416, a plurality of registers 418, the local memory 420, and a second example bus 422. Other structures may be present. For example, each core 402 may include vector unit circuitry, single instruction multiple data (SIMD) unit circuitry, load/store unit (LSU) circuitry, branch/jump unit circuitry, floating-point unit (FPU) circuitry, etc. The control unit circuitry 414 includes semiconductor-based circuits structured to control (e.g., coordinate) data movement within the corresponding core 402. The AL circuitry 416 includes semiconductor-based circuits structured to perform one or more mathematic and/or logic operations on the data within the corresponding core 402. The AL circuitry 416 of some examples performs integer based operations. In other examples, the AL circuitry 416 also performs floating-point operations. In yet other examples, the AL circuitry 416 may include first AL circuitry that performs integer-based operations and second AL circuitry that performs floating-point operations. In some examples, the AL circuitry 416 may be referred to as an Arithmetic Logic Unit (ALU).

The registers 418 are semiconductor-based structures to store data and/or instructions such as results of one or more of the operations performed by the AL circuitry 416 of the corresponding core 402. For example, the registers 418 may include vector register(s), SIMD register(s), general-purpose register(s), flag register(s), segment register(s), machine-specific register(s), instruction pointer register(s), control register(s), debug register(s), memory management register(s), machine check register(s), etc. The registers 418 may be arranged in a bank as shown in FIG. 4. Alternatively, the registers 418 may be organized in any other arrangement, format, or structure, such as by being distributed throughout the core 402 to shorten access time. The second bus 422 may be implemented by at least one of an I2C bus, a SPI bus, a PCI bus, or a PCIe bus.

Each core 402 and/or, more generally, the microprocessor 400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 400 is a semiconductor device fabricated to include many transistors interconnected to implement the structures described above in one or more integrated circuits (ICs) contained in one or more packages.

The microprocessor 400 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs such as those discussed herein. A GPU, DSP and/or other programmable device can also be an accelerator. Accelerators may be on-board the microprocessor 400, in the same chip package as the microprocessor 400 and/or in one or more separate packages from the microprocessor 400. It should be understood that some or all of the circuitry of FIG. 1 may, thus, be instantiated at the same or different times. For example, same and/or different portion(s) of the microprocessor 400 of FIG. 4 may be programmed to execute portion(s) of machine-readable instructions at the same and/or different times.

In some examples, some or all of the circuitry of FIG. 1 may be instantiated, for example, in one or more threads executing concurrently and/or in series. For example, the microprocessor 400 of FIG. 4 may execute machine readable instructions in one or more threads executing concurrently and/or in series. Moreover, in some examples, some or all of the circuitry of FIG. 1 may be implemented within one or more virtual machines and/or containers executing on the microprocessor 400 of FIG. 4.

In some examples, the programmable circuitry 312 of FIG. 3 may be in one or more packages. For example, the microprocessor 400 of FIG. 4 may be in one or more packages. In some examples, an XPU may be implemented by the programmable circuitry 312 of FIG. 3, which may be in one or more packages. For example, the XPU may include a CPU (e.g., the microprocessor 400 of FIG. 4) in one package, a DSP in another package, and a GPU in yet another package.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more CPUs, one or more GPUs, one or more NPUs, one or more DSPs, etc., and/or any combination(s) thereof), and orchestration technology (e.g., application programming interface(s) (API(s))) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that employ NLP models to interpret, modify, and/or represent shift change notes on a workstation operating in a process control system. Disclosed examples provide accessible representations of shift change notes that emphasize key notes (e.g., alarms) from accessory notes (e.g., redundant information, out-of-date information, etc.) associated with the process control system. For example, disclosed examples transmit shift change notes associated with a first shift operator to a NLP model that, in turn, generates an example representation of the shift change notes. In turn, a second shift operator can access the representation of the shift change notes, where the representation is easier to read, understand, navigate, etc., than the shift change notes themselves. Disclosed systems, apparatus, articles of manufacture, and methods improve the efficiency of using a computing device by providing an operator (e.g., a second shift operator) of an example workstation in the process control system with a straightforward representation of the process control system and enabling an operator to promptly respond to system abnormalities and alarms. Disclosed systems, apparatus, articles of manufacture, and methods are accordingly directed to one or more improvement(s) in the operation of a machine such as a computer or other electronic and/or mechanical device.

Example 1 includes an apparatus comprising interface circuitry, machine-readable instructions, and at least one processor circuit to be programmed by the machine-readable instructions to access input data from a workstation in a process control system, the input data associated with a first user account, transmit the input data to a natural language processing (NLP) model, the NLP model to generate a representation of the input data based on stored data associated with the process control system, and display the representation of the input data on a user interface of the workstation after detecting an access of a second user account different from the first user account.

Example 2 includes the apparatus of example 1, wherein the input data corresponds to at least one of an event, a notification, an operator note, shift change note, or an alarm associated with the process control system at a first time.

Example 3 includes the apparatus of example 2, wherein the second user account accesses the workstation at a second time sequential relative to the first time.

Example 4 includes the apparatus of example 1, wherein the representation of the input data is at least one of a graphical representation, a textual representation, or a sound.

Example 5 includes the apparatus of example 1, wherein the machine-readable instructions, when executed or instantiated by one or more of the at least one processor circuit, cause the one or more of the at least one processor circuit to assign a first weight to a first portion of the representation and a second weight to a second portion of the representation, and modify at least one of the first portion or the second portion based on the second weight being greater than the first weight.

Example 6 includes the apparatus of example 1, wherein the representation is a first representation, wherein the NLP model is to generate a second representation of a difference between the input data and the stored data, wherein the machine-readable instructions, when executed or instantiated by one or more of the at least one processor circuit, cause the one or more of the at least one processor circuit to access the second representation of the difference generated by the NLP model, and display the second representation on the user interface.

Example 7 includes the apparatus of example 1, wherein the machine-readable instructions, when executed or instantiated by one or more of the at least one processor circuit, cause the one or more of the at least one processor circuit to access a request for the input data from the second user account, and display the representation of the input data on the user interface after receiving the request.

Example 8 includes a non-transitory machine-readable storage medium comprising instructions to cause programmable circuitry to at least access input data from a workstation in a process control system, the input data associated with a first user account, transmit the input data to a natural language processing (NLP) model, the NLP model to generate a representation of the input data based on stored data associated with the process control system, and display the representation of the input data on a user interface of the workstation after detecting an access of a second user account different from the first user account.

Example 9 includes the non-transitory machine-readable storage medium of example 8, wherein the input data corresponds to at least one of an event, a notification, an operator note, shift change note, or an alarm associated with the process control system at a first time.

Example 10 includes the non-transitory machine-readable storage medium of example 9, wherein the second user account accesses the workstation at a second time sequential relative to the first time.

Example 11 includes the non-transitory machine-readable storage medium of example 8, wherein the representation of the input data is at least one of a graphical representation, a textual representation, or a sound.

Example 12 includes the non-transitory machine-readable storage medium of example 8, wherein the instructions, when executed or instantiated by the programmable circuitry, further cause the programmable circuitry to assign a first weight to a first portion of the representation and a second weight to a second portion of the representation, and modify at least one of the first portion or the second portion based on the second weight being greater than the first weight.

Example 13 includes the non-transitory machine-readable storage medium of example 8, wherein the representation is a first representation, wherein the NLP model is to generate a second representation of a difference between the input data and the stored data, wherein the instructions, when executed or instantiated by the programmable circuitry, further cause the programmable circuitry to access the second representation of the difference generated by the NLP model, and display the second representation on the user interface.

Example 14 includes the non-transitory machine-readable storage medium of example 8, wherein the instructions, when executed or instantiated by the programmable circuitry, further cause the programmable circuitry to access a request for the input data from the second user account, and display the representation of the input data on the user interface after receiving the request.

Example 15 includes a method comprising accessing, by at least one processor circuit programmed by at least one instruction, input data from a workstation in a process control system, the input data associated with a first user account, transmitting, by one or more of the at least one processor circuit, the input data to a natural language processing (NLP) model, the NLP model to generate a representation of the input data based on stored data associated with the process control system, and displaying, by one or more of the at least one processor circuit, the representation of the input data on a user interface of the workstation after detecting an access of a second user account different from the first user account.

Example 16 includes the method of example 15, wherein the input data corresponds to at least one of an event, a notification, an operator note, shift change note, or an alarm associated with the process control system at a first time.

Example 17 includes the method of example 16, wherein the second user account accesses the workstation at a second time sequential relative to the first time.

Example 18 includes the method of example 15, further including assigning a first weight to a first portion of the representation and a second weight to a second portion of the representation, and modifying at least one of the first portion or the second portion based on the second weight being greater than the first weight.

Example 19 includes the method of example 15, wherein the representation is a first representation, wherein the NLP model is to generate a second representation of a difference between the input data and the stored data, further including accessing the second representation of the difference generated by the NLP model, and displaying the second representation on the user interface.

Example 20 includes the method of example 15, further including accessing a request for the input data from the second user account, and displaying the representation of the input data on the user interface after receiving the request.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:

interface circuitry;

machine-readable instructions; and at least one processor circuit to be programmed by the machine-readable instructions to:

access input data from a workstation in a process control system, the input data including shift change notes prepared by a user associated with a first user account;

transmit the input data to a natural language processing (NLP) model, the NLP model to generate a representation of the input data based on stored data associated with the process control system, the representation of the input data including a representation of the shift change notes, the representation of the shift change notes to be modified relative to the shift change notes as prepared by the user; and display the representation of the input data on a user interface of the workstation after detecting an access of a second user account different from the first user account.

2. The apparatus of claim 1, wherein the input data includes information indicative of at least one of an event, a notification, or an alarm associated with the process control system during a first shift.

3. The apparatus of claim 2, wherein the second user account accesses the workstation during a second shift sequential relative to the first shift.

4. The apparatus of claim 1, wherein the representation of the input data is at least one of a graphical representation, a textual representation, or a sound.

5. The apparatus of claim 1, wherein the machine-readable instructions, when executed or instantiated by one or more of the at least one processor circuit, cause the one or more of the at least one processor circuit to:

assign a first weight to a first portion of the representation and a second weight to a second portion of the representation; and modify at least one of the first portion or the second portion based on the second weight being greater than the first weight.

6. The apparatus of claim 1, wherein the representation is a first representation, wherein the NLP model is to generate a second representation of a difference between the input data and the stored data, wherein the machine-readable instructions, when executed or instantiated by one or more of the at least one processor circuit, cause the one or more of the at least one processor circuit to:

access the second representation of the difference generated by the NLP model; and display the second representation on the user interface.

7. The apparatus of claim 1, wherein the machine-readable instructions, when executed or instantiated by one or more of the at least one processor circuit, cause the one or more of the at least one processor circuit to:

access a request for the input data from the second user account; and display the representation of the input data on the user interface after receiving the request.

8. A non-transitory machine-readable storage medium comprising instructions to cause programmable circuitry to at least:

access input data from a workstation in a process control system, the input data including shift change notes prepared by a user associated with a first user account;

transmit the input data to a natural language processing (NLP) model, the NLP model to generate a representation of the input data based on stored data associated with the process control system, the representation of the input data including a representation of the shift change notes, the representation of the shift change notes to be modified relative to the shift change notes as prepared by the user; and display the representation of the input data on a user interface of the workstation after detecting an access of a second user account different from the first user account.

9. The non-transitory machine-readable storage medium of claim 8, wherein the input data includes information indicative of at least one of an event, a notification, or an alarm associated with the process control system during a first shift.

10. The non-transitory machine-readable storage medium of claim 9, wherein the second user account accesses the workstation during a second shift sequential relative to the first shift.

11. The non-transitory machine-readable storage medium of claim 8, wherein the representation of the input data is at least one of a graphical representation, a textual representation, or a sound.

12. The non-transitory machine-readable storage medium of claim 8, wherein the instructions, when executed or instantiated by the programmable circuitry, further cause the programmable circuitry to:

assign a first weight to a first portion of the representation and a second weight to a second portion of the representation; and modify at least one of the first portion or the second portion based on the second weight being greater than the first weight.

13. The non-transitory machine-readable storage medium of claim 8, wherein the representation is a first representation, wherein the NLP model is to generate a second representation of a difference between the input data and the stored data, wherein the instructions, when executed or instantiated by the programmable circuitry, further cause the programmable circuitry to:

access the second representation of the difference generated by the NLP model; and display the second representation on the user interface.

14. The non-transitory machine-readable storage medium of claim 8, wherein the instructions, when executed or instantiated by the programmable circuitry, further cause the programmable circuitry to:

access a request for the input data from the second user account; and display the representation of the input data on the user interface after receiving the request.

15. A method comprising:

accessing, by at least one processor circuit programmed by at least one instruction, input data from a workstation in a process control system, the input data including shift change notes prepared by a user associated with a first user account;

transmitting, by one or more of the at least one processor circuit, the input data to a natural language processing (NLP) model, the NLP model to generate a representation of the input data based on stored data associated with the process control system, the representation of the input data including a representation of the shift change notes, the representation of the shift change notes to be modified relative to the shift change notes as prepared by the user; and displaying, by one or more of the at least one processor circuit, the representation of the input data on a user interface of the workstation after detecting an access of a second user account different from the first user account.

16. The method of claim 15, wherein the input data includes information indicative of at least one of an event, a notification, or an alarm associated with the process control system during a first shift.

17. The method of claim 16, wherein the second user account accesses the workstation during a second shift sequential relative to the first shift.

18. The method of claim 15, further including:

assigning a first weight to a first portion of the representation and a second weight to a second portion of the representation; and modifying at least one of the first portion or the second portion based on the second weight being greater than the first weight.

19. The method of claim 15, wherein the representation is a first representation, wherein the NLP model is to generate a second representation of a difference between the input data and the stored data, further including:

accessing the second representation of the difference generated by the NLP model; and displaying the second representation on the user interface.

20. The method of claim 15, further including:

accessing a request for the input data from the second user account; and displaying the representation of the input data on the user interface after receiving the request.

* * * * *